United States Patent [19]

Pittman et al.

[11] Patent Number: 5,534,352

[45] Date of Patent: Jul. 9, 1996

[54] FINISHING PROCESS FOR TEXTURED PANELS, AND STRUCTURES MADE THEREBY

[75] Inventors: Raymond H. Pittman, Batavia; Mark A. Ruggie, Lombard; Karine A. Luetgert, Geneva, all of Ill.

[73] Assignee: Masonite Corporation, Chicago, Ill.

[21] Appl. No.: 291,417

[22] Filed: Aug. 16, 1994

[51] Int. Cl.⁶ ...................................................... B32B 9/00
[52] U.S. Cl. ........................ 428/535; 428/161; 428/172; 428/201; 428/206; 428/207; 428/511; 428/512; 428/513; 428/537.1; 427/280; 427/408; 118/72
[58] Field of Search ........................ 118/72, 58; 428/195, 428/161, 172, 201, 206, 207, 511, 512, 535, 513; 427/280, 408

[56] References Cited

U.S. PATENT DOCUMENTS

| | | | |
|---|---|---|---|
| 2,217,265 | 10/1940 | Cislak | 21/45 |
| 2,388,880 | 11/1945 | Stitt | 18/47.5 |
| 2,630,395 | 3/1953 | McCullough et al. | 154/121 |
| 2,971,856 | 2/1961 | Lauring | 117/10 |
| 3,069,290 | 12/1962 | Berry | 117/72 |
| 3,080,257 | 3/1963 | Berry | 117/72 |
| 3,700,533 | 10/1972 | Schmitz | 161/5 |
| 4,141,949 | 2/1979 | Hinojosa et al. | 264/134 |
| 4,390,564 | 6/1983 | Kimble | 427/35 |
| 4,722,854 | 2/1988 | Cope | 427/280 |
| 4,844,850 | 7/1989 | Harder | 264/129 |
| 5,075,059 | 12/1991 | Green | 264/129 |
| 5,076,985 | 12/1991 | Koch et al. | 264/119 |

Primary Examiner—Patrick J. Ryan
Assistant Examiner—Abraham Bahta
Attorney, Agent, or Firm—Marshall, O'Toole, Gerstein, Murray & Borun

[57] ABSTRACT

A process of pre-finishing wood composite panels and/or structures having flat and contoured surfaces to result in a structure exhibiting the appearance of natural hard wood includes the steps of (1) providing a textured substrate; (2) applying a ground coat to the substrate; (3) applying a buffing glaze to the substrate; (4) selectively removing a portion of the buffing glaze from the substrate; and (5) applying a sealer to retain the remaining buffing glaze in textured ticks of the substrate.

53 Claims, 3 Drawing Sheets

FINISHING PROCESS FOR TEXTURED PANELS, AND STRUCTURES MADE THEREBY

BACKGROUND OF THE INVENTION

1. Field of the Invention

The invention relates generally to surface finishing processes and more particularly to a pre-finishing process for textured wood composite substrates to achieve a natural appearing wood finish thereon.

2. Description of Related Technology

To make composite wood panels appear like natural hardwood, such structures are typically finished by multiple applications of stains or glazes which are then selectively removed by hand. Additionally or alternatively, portions of a composite panel may be highlighted by spray gun application of a shading material.

Attempts have been made to finish wood composite panels or structures, such as a door, utilizing an automatic finishing line. However, such process lines have not been fully automated because hand-rubbing has been required to achieve the appearance of natural hardwood. The hand-finishing step of the finishing process is not only slow (e.g., for panels or door facings it results in very low production speeds of five to thirty feet of material per minute), but expensive because it is labor intensive.

Furthermore, because such a process line requires sufficient "open" time to allow for hand-rubbing of the composite panel, solvent- or lacquer-based products, which can present health and fire hazards, have been utilized to finish the wood in lieu of safer water-based wood finishing products.

Prior to the invention, there have been no known in-line, fully automatic finishing processes utilizing water-based finishing products that produce a realistic wood finish on a contoured surface such as a molded door panel.

SUMMARY OF THE INVENTION

It is an object of the invention to overcome one or more of the problems described above.

According to the invention, a process of pre-finishing molded surfaces is provided comprising the steps of (1) providing a textured substrate; (2) applying a ground coat to the substrate; (3) applying a buffing glaze to the ground coated substrate; (4) selectively removing a portion of the buffing glaze from the coated substrate; and, (5) applying a sealer.

A structure according to the invention is provided by preparing a wood composite panel according to the five pre-finishing process steps of the invention.

Other objects and advantages of the invention will be apparent to those skilled in the art from the following detailed description taken in conjunction with the drawings and the appended claims.

DETAILED DESCRIPTION OF THE INVENTION

According to the invention, an in-line automatic finishing process is provided for semi-finishing or finishing wood composite panels or structures, such as textured molded door facings, for example, utilizing waterborne finishing products. According to a process of the invention, contoured composite structures are prepared having realistic wood-like appearance which may then be finished in-line or simply pre-finished and then shipped to a customer who can tone the structures in any of numerous colors to meet specific market needs.

A pre-finishing process according to the invention includes five consecutive steps. First, a textured (i.e. embossed with a tick or grain pattern) substrate is provided. Secondly, a ground coat is applied to the substrate. In a third step, a dry buffing glaze is applied to the ground coated substrate. The substrate is then buffed to selectively remove the buffing glaze from portions of a surface thereof and a sealer is applied to retain the glaze in the textured ticks.

Structures pre-finished according to the inventive process may then be further prepared according to the invention to result in finished structures or pre-finished structures which may be toned by a customer. The five-step pre-finishing process is described more fully below, followed by descriptions of semi-finishing and finishing steps according to the invention.

A. Pre-finishing Process

1. Providing a Substrate

Figure 1:
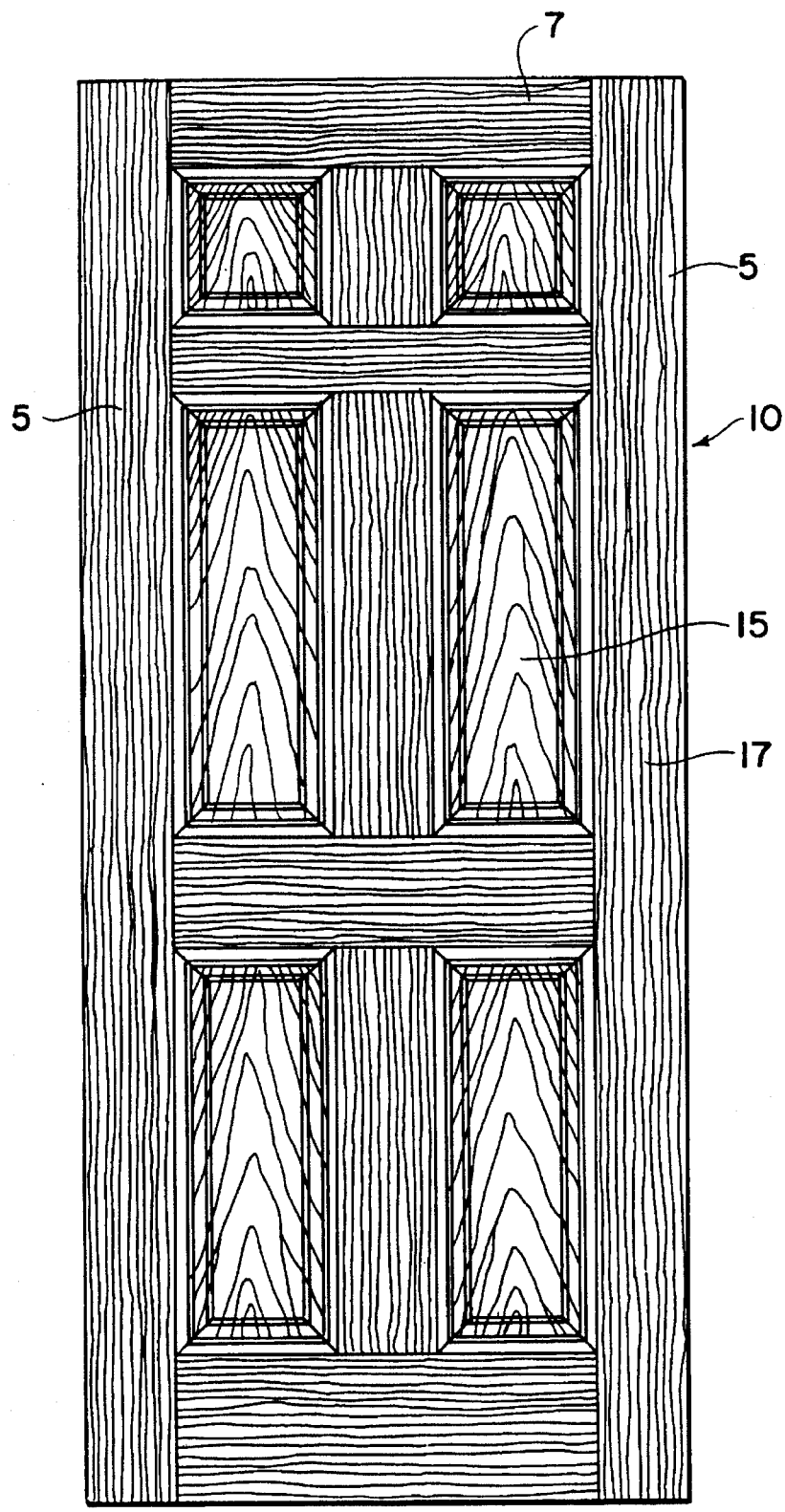
FIG. 1 is a front elevational view of a door facing utilized as a substrate according to the invention.
Figure 2:
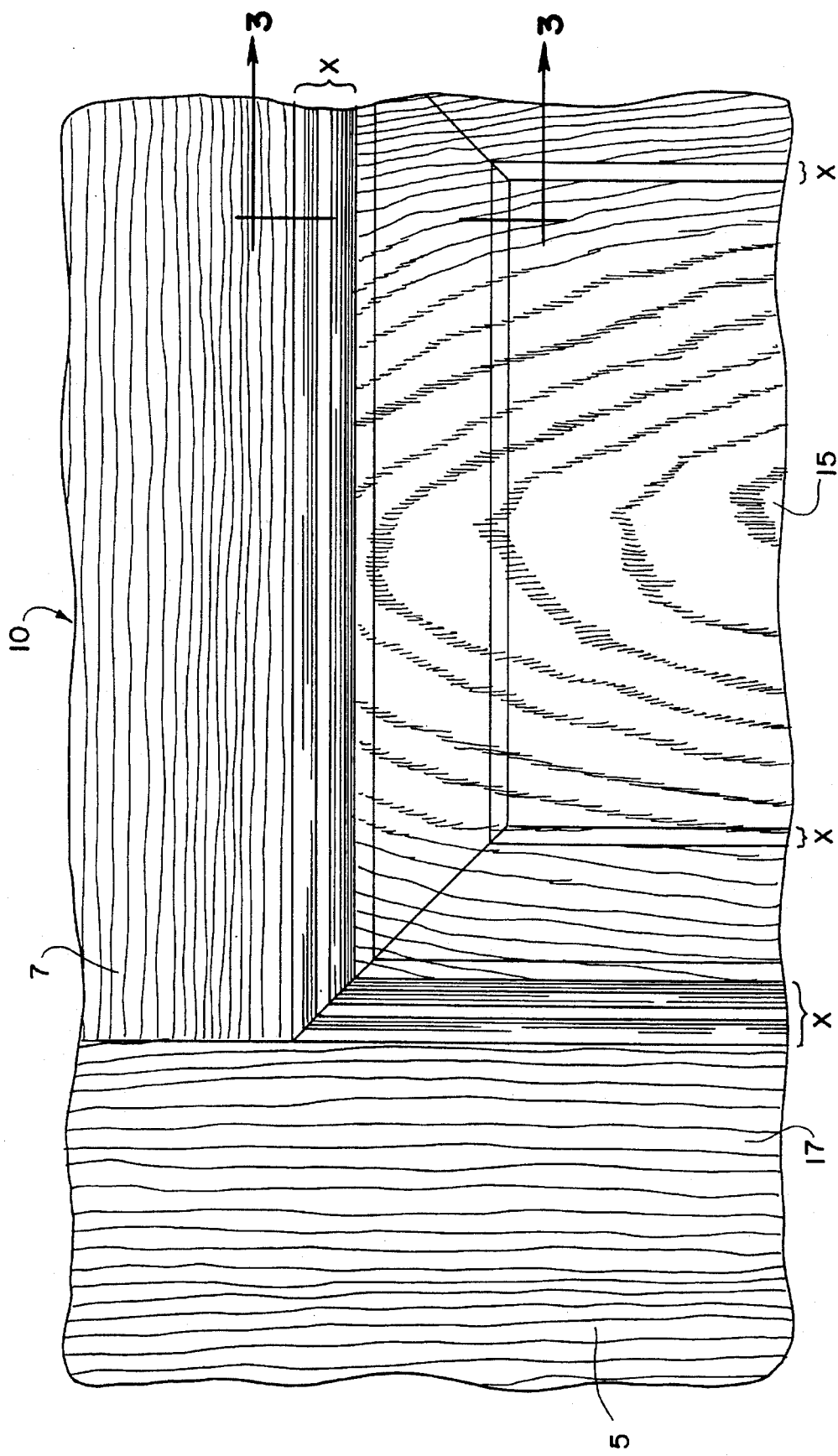
FIG. 2 is an enlarged partial front elevational view of the door facing of FIG. 1.
Figure 3:
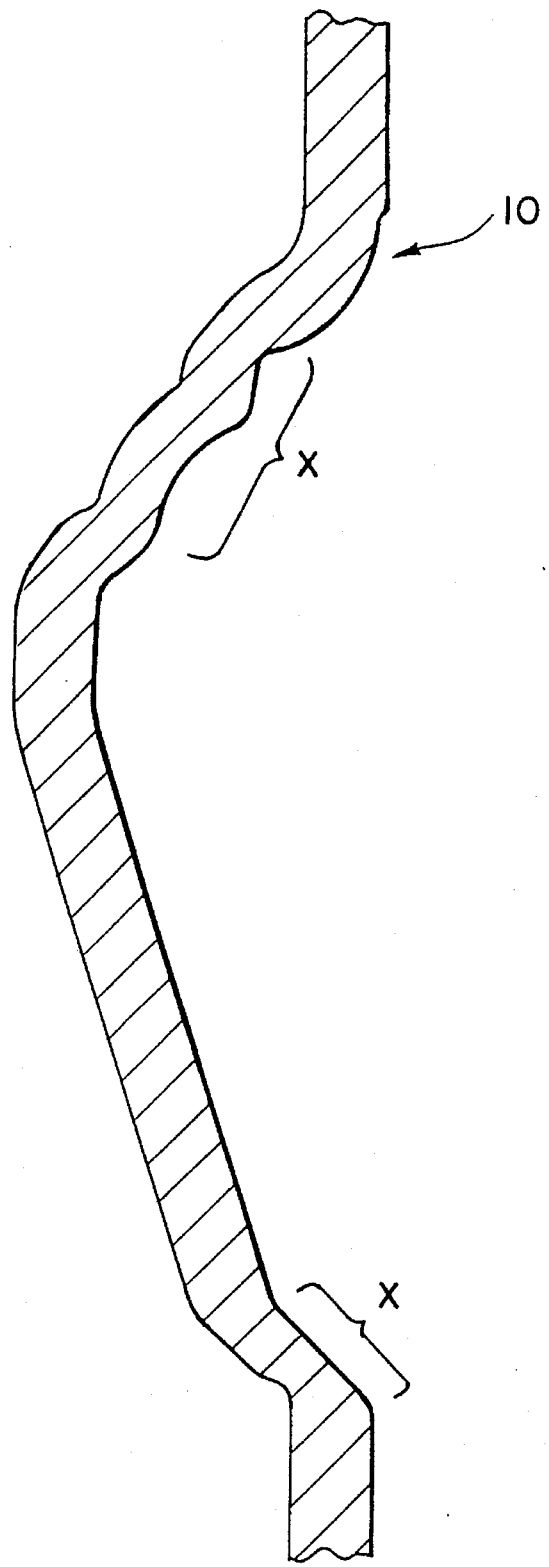
FIG. 3 is a cross-sectional view taken along the line 3—3 of FIG. 2.

A first step of a process according to the invention is to provide a textured wood composite substrate. The substrate may be flat, such as a flat panel, for example. However, a structure according to the invention advantageously results when the substrate has both flat and contoured surfaces, such as a molded door facing, generally designated 10, shown in FIGS. 1–3, for example.

A substrate may be prepared by compressing a wood composite mat between a molded core and cavity die set. Each die half is attached to a heated platen of a press. The "texture" is embossed into a surface of the mat by the core die during the compressing of the mat into a molded panel.

The wood composite panel is preferably embossed with a fine texture. The size, width, and length of the tick (i.e. pits in the wood) and the pattern formed thereby (i.e. the grain pattern) determine the overall aesthetics of the composite panel, which is preferably based upon original art work developed from natural wood.

The substrate may be embossed with a straight grain pattern, or grain patterns positioned in a variety of directions. For example, the flat and contoured portions of the door panel shown in FIGS. 1 and 2 may be embossed with grain patterns oriented to represent the stiles 5 and rails 7 of a door made from solid wood pieces. The substrate preferably includes a balance of embossed cathedral (i.e. curved) 15 and straight grain 17 patterns in order to achieve realism in the finished product and to aid in providing a basis for registering prints onto the substrate.

The tick depth pattern and depth range for a particular textured substrate depend upon the type of wood being replicated. The tick depth of the textured substrate preferably ranges between about 0.002 inches and about 0.008 inches (between about 0.0035 inches and about 0.006 inches is particularly preferred).

Selected areas of a substrate may not have a grain pattern embossed thereon. For example, with reference to FIGS. 2 and 3, contoured portions x of the door panel 10 may remain untextured to aid in the release of the panel from an embossing die after the raw wood material is pressed into a composite structure. Also, a contoured portion of a structure might not be textured so as to create a continuous shadow line which visually increases the depth of a finished structure.

The substrate should have a surface layer adequately dense to maintain sharp fidelity in the textured and contoured areas of the product. Without surface integrity, detail and sharpness of the grain pattern and thus the realism of the finished product would be lost. If the substrate is too porous it may exhibit undesirable surface roughness which would be visible after the pre-finishing process is performed on the substrate, or surface damage may be encountered during shipping.

Any dust or debris on the surface of the substrate is preferably removed via a brush and/or vacuum prior to application of a ground coat thereon.

2. Application of a Ground Coat

In a second step according to the invention, a wood-toned ground or base coat is applied to the textured substrate. The ground coat is preferably sprayed onto the substrate to a dry film thickness of about 1.2 to about 1.5 mil thickness. The ground coat is preferably applied in at least two passes in a spray booth with drying between coats. The coating exhibits a very smooth, opaque finish with good uniformity over the flat and contoured areas of a substrate. A uniform film thickness is important because film thickness variation affects the reception of the dry buffing glaze applied in the third step of the process and how much of the glaze is retained or buffed off.

The ground coat is formulated to minimize foaming in the spray coating equipment and to achieve smoothness without excessive build-up on the substrate during the application of the coating which might result in blistering and other paint curing problems. The pigment, grind, and rheology of the ground coat are balanced so as not to clog the spray guns. Also, the ground coat must not fill up the fine wood grain texture of the substrate.

The ground coat is preferably a waterborne coating as opposed to a solvent-based coating. Although solvent-based coatings could be utilized in the process according to the invention, they are undesirable because of health and fire concerns.

The ground coat is formulated using fine-grind pigments to result in a smooth finish; a high concentration of primary pigments to produce an opaque coating with a minimum film thickness; and a substantially hard resin, to impart "slickness" to the coating so that the dry buffing glaze is easily removed from the surface of the substrate during a fourth step of the process.

Preferably, the ground coat is an acrylic emulsion exhibiting the properties set forth in Table I.

TABLE I

PROPERTIES OF THE GROUND COAT AND THE DRY BUFFING GLAZE

| PROPERTY | GROUND COAT | DRY BUFFING GLAZE |
| --- | --- | --- |
| Resin Type | Acrylic Emulsion | Acrylic Emulsion |
| Density (lbs./gal.) | 10–12 | 10–12 |
| Non-volatiles (wt. %) | 40–60 | 40–55 |
| Non-volatiles (vol. %) | 25–45 | 20–40 |
| Pigment Concentration (vol. %) | 40–60 | 60–90 |

TABLE I-continued

PROPERTIES OF THE GROUND COAT AND THE DRY BUFFING GLAZE

| PROPERTY | GROUND COAT | DRY BUFFING GLAZE |
| --- | --- | --- |
| Pigmentation | | |
| % Prime | 20–50 | 10–30 |
| % Extender | 50–80 | 70–90 |
| pH | 6–9 | 8–10 |
| Reduction for use (vol. % water) | 0–10 | 25–50 |

A particularly preferred ground coat for use in the second step of a pre-finishing process according to the invention may be purchased from Akzo Coatings, Inc. (Salem, Oreg. and High Point, N.C.) under the trade designation Series No. 630 Ground Coat. A comparable ground coat may be purchased from Guardsman Coatings (Seattle, Wash. and High Point, N.C.) under the trade designation Series No. 447 Base Coat.

After the ground coat is applied, the substrate is preferably conveyed through an in-line oven where the ground coat is flash dried to a surface board temperature of between about 120° F. and about 160° F.

3. Application of a Dry Buffing Glaze

In a third step according to a process of the invention, a dry buffing glaze is sprayed on the substrate to which the ground coat has been applied in an amount to result in a dry thickness of about 0.75 to about 1.2 mil.

The dry buffing glaze is preferably a waterborne coating, applied to the substrate as a liquid and then flash dried in an in-line oven to a board surface temperature of between about 110° F. and about 190° F. The dried, glazed surface of the substrate has a dull powdery appearance. The true color of the glaze is not evident until it is wetted in a subsequent toning or top-coating step.

The dry buffing glaze includes little or no resin so that it exhibits minimum adhesion to the ground coat. However, the pigment to resin ratio of the glaze is balanced so that the glaze clings to the embossed wood grain texture of the substrate. The glaze has a high proportion (e.g. at least about 80 wt. %) of inert pigments so as to make it powdery and easily buffed from flat surfaces of the substrate.

Preferably, the dry buffing glaze is an acrylic emulsion exhibiting the properties set forth in Table I. A particularly preferred dry buffing glaze for use in the third step of a pre-finishing process according to the invention may be purchased from Akzo Coatings, Inc. (Salem, Oreg. and High Point, N.C.) under the trade designation Series No. 620 Dry Buffing Glaze. A comparable dry buffing glaze may be purchased from Guardsman Coatings (Seattle, Wash. and High Point, N.C.) under the trade designation Series No. 440 Powder Glaze.

4. Selective Buffing

The dry buffing glaze is selectively removed from portions of the substrate in a fourth step of a process according to the invention. A rotating brush or denibber is preferably utilized to buff the dry glaze from the flat or molded profiled portions of the substrate while leaving the dry buffing glaze in the textured ticks of the substrate. The denibber uses multiple, counter-rotating brushes which are set at an angle of between about 35° and about 45° with respect to the direction of travel of the substrate. The brushes are preferably made from a synthetic material (e.g., nylon) and may be impregnated with an abrasive powder (e.g., carborundum made by the 3M Corporation, Minneapolis, Minn.).

The rotation of the brushes and the downward pressure the brushes place on the substrate are synchronized with the conveyor speed so as to remove all the glaze except that which is in the wood grain ticks. This mechanical buffing step subtly renders the substrate (i.e. provides a contrast between the smooth and textured portions of the substrate) resulting in a natural wood grain appearance. In contrast, if the substrate would be hand-rubbed during this step, the pressure of a glazing cloth could wipe the glaze out of the wood grain ticks, yielding a less realistic appearance. Furthermore, the rotating brushes utilized to selectively remove the dry buffing glaze also polish the surface of the substrate, contributing to the natural hard wood appearance thereof.

The substrate must be adequately supported during the fourth process step to result in a uniform buffing of the dry buffing glaze from the substrate surface.

If desired, the dry buffing powder removed from the substrate during buffing may be collected, filtered and then re-used in the third step of the process.

5. Application of a Sealer

A substrate which has been prepared according to the four steps of the invention described in paragraphs A.1. through A.4. herein, may then be coated with a clear sealer applied to the entire exposed surface of the substrate. The sealer binds the dry buffing glaze to the substrate and protects the panel finish during storage, shipping, and handling of the pre-finished substrate. The clear sealer also renders the substrate receptive to lacquer or solvent-based glazes and toners which may be applied to the substrate as a final finishing step.

The clear sealer is sprayed on the substrate in an amount to result in a dry film thickness of about 0.1 mil to about 0.5 mil.

Preferably, the sealer is a clear acrylic sealer. A particularly preferred clear acrylic sealer may be purchased from Akzo Coatings, Inc. (Salem, Oreg. and High Point, N.C.) under the trade designation Series No. 680 Top Coat/Sealer. A comparable clear acrylic sealer may be purchased from Guardsman Coatings (Seattle, Wash. and High Point, N.C.) under the trade designation Series No. 445 Top Coat.

After the sealer is applied, the substrate is preferably conveyed through an in-line oven where the sealer is flash dried to a surface board temperature of between about 120° F. and about 190° F.

Another sealer for use in the invention may be a clear, waterborne catalyzed acrylic top coat. The clear sealer re-wets the dry buffing glaze, darkening the glaze to its true color. The sealer also binds the dry buffing glaze to the ground coat. A particularly preferred catalyzed acrylic top coat may be purchased from Akzo Coatings, Inc. (Salem, Oreg. and High Point, N.C.) under the trade designation Series No. 680 Top Coat and No. 649-0J5-001B Catalyst. A comparable catalyzed acrylic top coat may be purchased from Guardsman Coatings (Seattle, Wash. and High Point, N.C.) under the trade designation Series No. 445 Top Coat and No. 490-5095 Catalyst.

After application of the catalyzed acrylic top coat, the substrate is preferably conveyed through an in-line oven where the material is flash dried. The substrate temperature in the oven ranges between about 260° F. and about 280° F.

The sealed substrate may be shipped to a customer for application of the final finishing glaze or toner by the customer. This is advantageous because the customer may tone the composite structures with one of a variety of single-toned topcoats, allowing the customer to easily and quickly meet its market requirements. Alternatively, the sealed substrate may be conveyed to other processing stations, wherein, for example, registered prints may be applied to the substrate.

B. Finishing Process

In a second embodiment of a finishing process and structure according to the invention, four additional consecutive process steps are performed on a substrate which has been prepared according to the five-step pre-finishing process according to the invention (paragraphs A.1 through A.5 herein). The four additional steps are as follows:

6. Application of a Semi-Transparent Toner to Non-Flat Surfaces

In an optional alternative sixth process step according to the invention, a translucent toner is selectively applied to recessed areas of a contoured substrate. This "valley" toner provides a deeper color or shadow to the contoured portions of the substrate which may be formulated to match the shading applied to upper, flat portions of the substrate utilizing gravure prints (described more fully in paragraph C.8. below). The application of a valley toner onto portions of the substrate results in a finished structure which exhibits a darker tone and thus enhanced depth.

The semi-transparent valley toner is preferably applied to the substrate via robot or computer-controlled sprayers in an amount to result in a dry thickness of about 0.1 mils to about 0.2 mils.

The valley toner may comprise both colored pigments and dyes to achieve greater realism. Preferably, the toner is waterborne and comprises a pigmented clear top coat. A particularly preferred pigmented clear top coat may be purchased from Akzo Coatings, Inc. (Salem, Oreg. and High Point, N.C.) under the trade designation Series No. 680 Sealer/Top Coat. A comparable pigmented clear top coat may be purchased from Guardsman Coatings (Seattle, Wash. and High Point, N.C.) under the trade designation Series No. 448 Toner.

After application of the valley toner, the substrate is preferably conveyed through an in-line oven where the material is flashed to remove excess water. The substrate temperature in the oven ranges between about 140° F. and about 180° F.

7. Application of a Semi-Transparent Toner to All Surfaces

An overall semi-transparent toner is then sprayed onto the entire exposed surface of the substrate in an amount to result in a dry thickness of about 0.1 mils to about 0.2 mils. The surface toner is applied to the substrate in order to add a translucent quality to the substrate and to result in an integrated appearance of the various substrate portions, unifying the dry buffing glaze and the valley toner.

The overall surface toner may comprise both colored pigments and dyes to add depth and richness to the finished structure. Preferably, the toner is waterborne and comprises pigmented clear acrylic sealer. A particularly preferred pigmented clear acrylic sealer may be purchased from Akzo Coatings, Inc. (Salem, Oreg. and High Point, N.C.) under the trade designation Series No. 680 Sealer/Top Coat. A comparable pigmented clear acrylic sealer may be purchased from Guardsman Coatings (Seattle, Wash. and High Point, N.C.) under the trade designation Series No. 448 Toner.

After application of the surface toner, the substrate is preferably conveyed through an in-line oven where the material is flashed to remove excess water. The substrate temperature in the oven ranges between about 140° F. and about 180° F.

8. Application of Reqistered Prints

In an eighth step according to a process of the invention, registered gravure or silk-screen prints are applied to selected flat portions of the substrate. The prints are indexed to the contours of the substrate and provide detail to the embossed grain patterns to capture the gradual shading changes occurring in natural hard wood. Art work for the registered prints is preferably developed from photographs of real wood and may be enhanced by hand glazing and air brush shading to create the color play of natural wood. The printing portion of the process may include the application of three prints to replicate grain patterns, tick and glaze.

The substrate must be adequately supported during the printing process to result in a uniform printing on the flat surfaces of the substrate.

The ink utilized to print the substrate preferably comprises waterborne acrylic inks which may be purchased from Akzo Coatings, Inc. (Salem, Oreg. and High Point, N.C.) under the trade designation Series No. 699 Interior Ink, for example. A comparable waterborne acrylic ink may be purchased from Guardsman Coatings (Seattle, Wash. and High Point, N.C.) under the trade designation Series No. 410.

9. Application of a Top Coat

A final step in a finishing process according to the invention is the application of a clear, thermosetting top coat onto the entire surface of the substrate via spray application to a dry thickness of about 1.2 mils to about 1.5 mils. The top coat binds all the previously applied coatings as well as providing the substrate with a high performance gloss finish.

Preferably, the top coat is waterborne and comprises catalyzed acrylic top coat. A particularly preferred catalyzed acrylic top coat may be purchased from Akzo Coatings, Inc. (Salem, Oreg. and High Point, N.C.) under the trade designation Series No. 680 Top Coat and No. 649-0J5-001B Catalyst. A comparable catalyzed acrylic top coat may be purchased from Guardsman Coatings (Seattle, Wash. and High Point, N.C.) under the trade designation Series No. 445 Top Coat and No. 490-5095 Catalyst.

The substrate to which the top coat has been applied is then conveyed through an in-line oven and subjected to an extended cure. The substrate preferably reaches a temperature of about 260° F. to about 280° F. in the oven. The finished structure is subsequently re-humidified to a desired shipping moisture content.

C. Alternative Finishing Process

In a third embodiment of a finishing process and structure according to the invention, two additional consecutive process steps are performed on a substrate which has been prepared according to the first five steps of the pre-finishing process of the invention (paragraphs A.1 through A.5 herein). The two additional steps are as follows:

6. Application of Registered Prints

This step is identical to the process step described in paragraph B.8. herein.

If desired, the step of applying a clear sealer (process step C.5.) may be omitted and registered prints may be applied after the dry buffing glaze is buffed from portions of the substrate.

7. Application of a Top Coat

This step is identical to the process step described in paragraph B.9. herein.

EXAMPLE

Pre-stained, wood grained molded door facings are coated according to the following sequence:

1. Providing a Substrate

Stained, but otherwise unfinished six-panel oak-design door facings are provided on a conveyor system running at a line speed of about 100 feet per minute. Some operations may require acceleration or deceleration conveyors to maintain the prescribed line speed. Dust and debris are removed from the surface of each door facing via a driven brush pick-up. The door facings are then preheated to a board surface temperature of about 110° F. to about 150° F. via a gas fired infra-red oven which may be purchased from Thermal Engineering Corporation, Columbia, S.C.

2. Application of a Ground Coat

The door facings are conveyed on a conveyor belt to first and second spray booths where a ground coat (Series No. 630 Ground Coat, purchased from Akzo Coatings, Inc., Salem, Oreg. and High Point, N.C.) is applied to the surfaces of the door facings to result in a dry film thickness of about 1.2 to about 1.5 mils. The ground coat is applied utilizing a linear spray coater using fixed airless spray nozzles (purchased from Spraying Systems Company, distributed by Swisher Associates, Randolph, N.J.).

Downstream of each ground coat spray booth are two consecutive high velocity hot air (HVHA) ovens (purchased from Thermal Engineering Corporation, Columbia, S.C.) utilized to flash dry the ground coat. Each application of the ground coat is flash dried by conveying the door facings through the HVHA ovens to reach a board surface temperature of about 120° F. to about 150° F. This board surface temperature range is maintained as the door facings are conveyed to a dry buffing glaze station.

3. Application of a Dry Buffing Glaze

The door facings are conveyed to a dry buffing glaze station wherein a dry buffing glaze (Series No. 620 purchased from Akzo Coatings, Inc., Salem, Oreg. and High Point, N.C.) is applied to the surface of the facings via a linear spray coater using fixed airless spray nozzles (purchased from Spraying Systems Company, distributed by Swisher Associates, Randolph, N.J.). The dry buffing glaze is applied in an amount to result in a dry film thickness of about 0.75 to about 1.2 mils.

The door facings are then conveyed to an HVHA oven (purchased from Thermal Engineering Corporation, Columbia, S.C.). The door facings are heated to a board surface temperature of about 140° F. to about 190° F. to flash dry the dry buffing glaze. All wetness (water) is driven off the dry buffing glaze.

4. Selective Buffing

The surfaces of the door facings are rendered by removing the excess dry buffing glaze from all door facing surfaces except the embossed wood grain texture. This is done by conveying the door facings through buffer stations utilizing a double Cefla Denibber (purchased from Cefla Inc., High Point, N.C.) equipped with helix wound bristles (length: 2,875 inches; diameter: 0.022 inches). The bristles are impregnated with 240 carborundum (purchased from 3 M Corporation, Minneapolis, Minn.). The denibber brushes counter rotate at 500 rpm with the brush shafts being set at an angle of 45° to the direction of travel of the door facings.

5. Application of a Sealer

The door facings are then conveyed to a sealer spray booth where a sealer (Series No. 680 Top Coat purchased from Akzo Coatings, Inc., Salem, Oreg. and High Point, N.C.) is applied to the entire surface of each door face to result in a dry film thickness of about 0.2 to about 0.5 mils. The spray booth is equipped with a linear spray coater using fixed airless spray nozzles (purchased from Spraying Systems Company, distributed by Swisher Associates, Randolph, N.J.).

The door facings are then conveyed to an HVHA oven (purchased from Thermal Engineering Corporation, Columbia, S.C.). The door facings are heated to a board surface temperature of about 150° F. to about 190° F. to flash dry the sealer.

6. Application of Registered Prints

Two indexed, registered prints are applied to the top surfaces of the door facings via two Buckley Offset Gravure Printing Machines (Model P-13GD-3 X50 purchased from Buckley Printers, Belleview, Wash.). Also utilized are offset gravure printing cylinders (Design Series No. 283 engraved by Wood Graphics, Inc., Cincinnati, Ohio) and waterborne acrylic inks (Series No. 699 purchased from Akzo Coatings Inc., Salem, Oreg. and High Point, N.C.).

7. Application of Top Coat

The door facings are then conveyed to a spray booth where a top coat (Series No. 680 Top Coat purchased from Akzo Coatings, Inc., Salem, Oreg. and High Point, N.C.) is applied to the entire surface of each door face to result in a dry film thickness of about 1.2 to about 1.5 mils. The spray booth is equipped with a linear spray coater using fixed airmix spray nozzles (purchased from Spraying Systems Company, distributed by Swisher Associates, Randolph, N.J. and utilizing Binks Vantage Spray Guns with No. 21–80 tips, Binks Manufacturing Company, Franklin Park, Ill.).

The door facings are then conveyed to two consecutive HVHA ovens (purchased from Thermal Engineering Corporation, Columbia, S.C.) to raise the board surface temperature to about 220° F. The door facings are then conveyed to a gas fired infra-red oven (purchased from Thermal Engineering Corporation, Columbia, S.C.) to raise the board surface temperature to between about 260° F. and 280° F.

The cured door facings may then be conveyed to a wetting or humidification station for restoring the moisture content of the door facings to between about 5 wt. % and about 6 wt. % via water surface spray. The wetting station is equipped with fixed airless spray nozzles (purchased from Spraying Systems Company, distributed by Swisher Associates, Randolph, N.J.).

The foregoing detailed description is given for clearness of understanding only, and no unnecessary limitations should be understood therefrom, as modifications within the scope of the invention will be apparent to those skilled in the art.

We claim:

1. A process of pre-finishing a wood composite structure comprising the consecutive steps of:
   (a) providing a textured substrate with pitted and smooth surface portions and further having flat and contoured surface portions;
   (b) applying a ground coat having smooth, opaque pigments to the substrate to substantially uniformly coat both the pitted and smooth surface portions;
   (c) applying a buffing glaze to the substrate;
   (d) buffing the substrate using a brush to selectively remove the buffing glaze from portions of the substrate; and
   (e) applying a sealer to the buffed surface to protect the remaining buffing glaze from being removed in subsequent operations.

2. The process of claim 1 wherein the textured substrate is an embossed wood composite structure, the texture being embossed on the substrate surface during consolidation thereof from raw wood material.

3. The process of claim 1 wherein the textured substrate has a tick depth ranging between about 0.002 inches and about 0.008 inches.

4. The process of claim 1 wherein the textured substrate exhibits at least one wood grain pattern.

5. The process of claim 4 wherein the textured substrate exhibits both cathedral and straight grain patterns.

6. The process of claim 1 wherein the ground coat is sprayed onto the substrate.

7. The process of claim 1 wherein the ground coat is applied to the substrate in an amount to result in a dry film thickness of about 1.2 mils to about 1.5 mils.

8. The process of claim 1 wherein the ground coat is a waterborne coating.

9. The process of claim 1 wherein the ground coat is an acrylic emulsion comprising properties shown in Table I hereof.

10. The process of claim 1 including the step of flash drying the substrate after the application of the ground coat thereto.

11. The process of claim 1 wherein the buffing glaze is sprayed onto the substrate.

12. The process of claim 1 wherein the buffing glaze is applied to the substrate in an amount to result in a dry film thickness of about 0.75 mils to about 1.2 mils.

13. The process of claim 1 wherein the buffing glaze is a waterborne coating.

14. The process of claim 1 wherein the buffing glaze includes a substantial amount of inert pigments.

15. The process of claim 1 wherein the buffing glaze is an acrylic emulsion comprising properties shown in Table I hereof.

16. The process of claim 1 including the step of flash drying the substrate after the application of the buffing glaze thereon.

17. The process of claim 1 wherein the buffing glaze is selectively removed from the smooth portions of the textured substrate.

18. The process of claim 1 wherein step (d) is performed by conveying the substrate past counter-rotating brushes.

19. The process of claim 19 wherein the brushes are disposed at an angle of between about 35° and about 45° with respect to the direction of travel of the substrate.

20. The process of claim 1 wherein the sealer of (e) is sprayed onto the substrate.

21. The process of claim 1 wherein the sealer of (e) is applied to the substrate in an amount to result in a dry film thickness of about 0.1 mils to about 0.3 mils.

22. The process of claim 1 wherein the sealer of (e) is a waterborne coating.

23. The process of claim 1 wherein the sealer of (e) comprises a clear acrylic emulsion.

24. The process of claim 1 including the step of drying the substrate after the application of the sealer, thereon.

25. The process of claim 1 further including the steps of:
   (f) applying a semi-transparent toner to the contoured portions of the substrate;
   (g) applying a semi-transparent toner to all surface portions of the substrate;
   (h) applying registered prints to the flat portions of the substrate; and
   (i) applying a top coat to all surface portions of the substrate.

26. The process of claim 25 wherein the semi-transparent toners applied in steps (f) and (g) are each sprayed onto the substrate.

27. The process of claim 26 wherein the semi-transparent toner applied to the substrate in step (f) is applied in an amount to result in a dry film thickness of about 0.1 mils to about 0.2 mils.

28. The process of claim 25 wherein the semi-transparent toners applied in steps (f) and (g) are each waterborne coatings.

29. The process of claim 25 wherein the semi-transparent toners applied in steps (f) and (g) comprise both colored pigments and dyes.

30. The process of claim 25 wherein the semi-transparent toner applied in step (f) comprises colored pigment and dyes added to clear acrylic sealer.

31. The process of claim 25 wherein the semi-transparent toner applied in step (g) comprises colored pigment and dyes added to clear acrylic sealer.

32. The process of claim 25 including the step of drying the substrate after the application of the semi-transparent toner in step (f).

33. The process of claim 25 including the step of drying the substrate after the application of the semi-transparent toner in step (g).

34. The process of claim 25 wherein the registered prints are indexed with respect to the contoured portions of the substrate.

35. The process of claim 25 wherein the top coat applied in step (i) is sprayed onto the substrate.

36. The process of claim 35 wherein the top coat is applied in an amount to result in a dry film thickness of about 1.2 mils to about 1.5 mils.

37. The process of claim 25 wherein the top coat is a waterborne coating.

38. The process of claim 25 wherein the top coat comprises catalyzed acrylic top coat.

39. The process of claim 25 including the step of drying the substrate after the application of the top coat in step (i).

40. The process of claim 1 wherein the substrate includes flat and contoured surface portions and including the steps of:

(f) applying registered prints to the flat portions of the substrate; and (g) applying a top coat to all surface portions of the substrate.

41. The process of claim 40 wherein the clear sealer is applied to the substrate in an amount to result in a dry film thickness of about 0.1 mils to about 0.2 mils.

42. The process of claim 40 wherein the sealer is a clear, waterborne coating.

43. The process of claim 40 wherein the sealer comprises acrylic waterborne coating.

44. The process of claim 40 including the step of drying the substrate after the application of the sealer.

45. The process of claim 40 wherein the registered prints are indexed with respect to the contoured portions of the substrate.

46. The process of claim 40 wherein the top coat is sprayed onto the substrate.

47. The process of claim 46 wherein the top coat is applied in an amount to result in a dry film thickness of about 1.2 mils to about 1.5 mils.

48. The process of claim 40 wherein the top coat is a waterborne coating.

49. The process of claim 40 wherein the top coat comprises catalyzed acrylic top coat.

50. The process of claim 40 including the step of drying the substrate after the application of the top coat.

51. A semi-finished wood composite panel or structure comprising:

(a) a wood composite substrate having a textured surface with pitted and smooth surface portions;

(b) a ground coat layer having smooth, opaque pigments substantially uniformly coating the pitted and smooth surface portions of the substrate;

(c) a buffing glaze disposed in the pitted portions of the substrate; and (d) a clear sealer substantially coating the ground coat and the buffing glaze.

52. The structure of claim 51 wherein the wood composite substrate includes flat surface portions and contoured surface portions and further comprising:

(e) a translucent toner disposed on the contoured surface portions;

(f) a semi-transparent toner substantially uniformly coating the flat and contoured surface portions of the substrate;

(g) registered prints disposed on the flat surface portions; and (h) a top coat substantially coating the ground coat, buffing glaze, toners and registered prints.

53. The structure of claim 51 wherein the wood composite substrate includes flat surface portions and contoured surface portions and said clear sealer substantially uniformly coats the flat and contoured surface portions of the substrate, said structure further comprising:

(e) registered prints disposed on the flat surface portions; and (g) a top coat substantially coating the ground coat, buffing glaze, clear sealer and registered prints.

* * * * *